United States Patent
Bordere et al.

(10) Patent No.: US 7,622,059 B2
(45) Date of Patent: Nov. 24, 2009

(54) METHOD FOR SYNTHESIS OF CARBON NANOTUBES

(75) Inventors: Serge Bordere, Jurancon (FR); Patrice Gaillard, Hagetaubin (FR); Carole Baddour, Montreal (CA)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 12/158,436

(22) PCT Filed: Dec. 22, 2006

(86) PCT No.: PCT/FR2006/051423

§ 371 (c)(1),
(2), (4) Date: Sep. 24, 2008

(87) PCT Pub. No.: WO2007/074312

PCT Pub. Date: Jul. 5, 2007

(65) Prior Publication Data

US 2009/0134363 A1    May 28, 2009

Related U.S. Application Data

(60) Provisional application No. 60/764,051, filed on Feb. 1, 2006.

(30) Foreign Application Priority Data

Dec. 23, 2005   (FR)   ................... 05 13230

(51) Int. Cl.
*H01B 1/04*    (2006.01)
*C01B 31/02*   (2006.01)

(52) U.S. Cl. .................. 252/502; 423/461; 423/447.2

(58) Field of Classification Search ................ 252/502, 252/510, 511; 502/182, 185; 423/461, 447.2, 423/447.1, 445 B See application file for complete search history.

(56) References Cited

U.S. PATENT DOCUMENTS

| | | | |
|---|---|---|---|
| 4,663,230 A | | 5/1987 | Tennent |
| 5,643,990 A | * | 7/1997 | Uehara et al. ................ 524/496 |
| 6,890,986 B2 | * | 5/2005 | Pruett ......................... 524/495 |
| 7,157,068 B2 | | 1/2007 | Li et al. |
| 7,239,073 B2 | * | 7/2007 | Takikawa et al. ............ 313/495 |
| 2001/0036549 A1 | | 11/2001 | Mandeville et al. |
| 2003/0004058 A1 | * | 1/2003 | Li et al. ...................... 502/258 |
| 2004/0000697 A1 | * | 1/2004 | Setoguchi et al. ........... 257/432 |
| 2004/0151654 A1 | | 8/2004 | Wei et al. |
| 2004/0160157 A1 | * | 8/2004 | Takikawa et al. ......... 313/346 R |
| 2005/0002851 A1 | * | 1/2005 | McElrath et al. ......... 423/447.3 |
| 2005/0074392 A1 | * | 4/2005 | Yang et al. ................ 423/447.3 |
| 2005/0118091 A1 | * | 6/2005 | Cooper et al. ............. 423/447.1 |
| 2006/0133982 A1 | * | 6/2006 | Kinloch et al. ............ 423/447.3 |
| 2006/0257310 A1 | * | 11/2006 | Tada et al. ................. 423/447.3 |
| 2007/0148962 A1 | * | 6/2007 | Kauppinen et al. .......... 438/637 |
| 2008/0193367 A1 | * | 8/2008 | Kalck et al. .............. 423/447.1 |
| 2009/0008610 A1 | * | 1/2009 | Bordere et al. .............. 252/511 |

FOREIGN PATENT DOCUMENTS

| | | |
|---|---|---|
| WO | WO 87/07559 | 12/1987 |
| WO | WO 2005085130 A2 * | 9/2005 |

* cited by examiner

*Primary Examiner*—Douglas Mc Ginty
(74) *Attorney, Agent, or Firm*—Steven D. Boyd

(57) ABSTRACT

The invention relates to a method for synthesis of carbon nanotubes of the highest carbon purity by the process of vapour phase chemical deposition. The nanotubes produced can be used to advantage in all know applications of carbon nanotubes.

12 Claims, 3 Drawing Sheets

METHOD FOR SYNTHESIS OF CARBON NANOTUBES

The subject of the present invention is a process for synthesizing carbon nanotubes (CNTs) by chemical vapor deposition, employing a fluidized catalyst bed.

PRIOR ART

Carbon nanotubes are recognized at the present time as being materials having great advantages because of their mechanical properties, their very high form factors (length/diameter ratios) and their electrical properties.

They are made up from graphite sheets that are wound up and terminated by hemispheres consisting of pentagons and hexagons with a structure similar to fullerenes.

Nanotubes are known to be composed of either a single sheet—referred to as single-walled nanotubes (SWNTs)—or of several concentric sheets—called multi-walled nanotubes (MWNTs). In general, SWNTs are more difficult to manufacture than MWNTs.

Carbon nanotubes may be produced by various processes, such as electrical discharge, laser ablation or chemical vapor deposition (CVD).

Among these techniques, the latter one seems to be the only one capable of manufacturing carbon nanotubes in large quantity, an essential condition for achieving a cost price allowing them to be used in bulk in polymer and/or resin applications in various industries such as the automobile, electronics, optoelectronics and thermal or electrical protection industries.

In this method, a carbon source is injected at a relatively high temperature onto a catalyst, said catalyst possibly consisting of a metal supported on an inorganic solid. Among metals, preferably cited are iron (Fe), cobalt (Co), nickel (Ni), and molybdenum (Mo) and among supports (hereinafter substrates) alumina, silica or magnesia are often found.

The carbon sources that may be envisaged are methane, ethane, ethylene, acetylene, ethanol, methanol, acetone, or even $CO/H_2$ synthesis gas (the HIPCO process).

Among the documents disclosing the synthesis of carbon nanotubes, mention may be made of WO 86/03455A1 from Hyperion Catalysis International Inc. corresponding to EP 225 556 B1, which may be considered as one of the basic patents regarding the synthesis of CNTs, which claims carbon fibrils (the old name for CNTs) that are almost cylindrical, the diameter of which is between 3.5 and 70 nm, the form factor being equal to 100 or higher, and also the process for preparing them.

The synthesis is carried out by bringing a catalyst containing iron (for example $Fe_3O_4$, Fe on a carbon substrate, Fe on an alumina substrate or Fe on a carbon fibril substrate) into contact with a carbon-containing gaseous compound (preferably CO or one or more hydrocarbons), advantageously in the presence of a compound capable of reacting with carbon in order to produce gaseous products (for example CO, $H_2$ or $H_2O$). In the examples, the catalysts are prepared by dry impregnation, by precipitation or by wet impregnation.

Document WO 87/07559 corresponding to document EP 270 666 B1 of the same Applicant claims a process for manufacturing fibrils with a diameter of between 3.5 and 70 nm but with an aspect ratio L/D of between 5 and 100 from the same reactants and catalysts.

No information about the productivity (which would be expressed as the mass of fibrils formed per gram of catalyst and per unit time) is given, except the fact that it is necessary, if the carbon-containing gaseous compound is benzene, to work at above 800° C.

Other documents claim process improvements, such as the continuous fluidized bed that allows the state of aggregation of the catalyst and of the carbon materials formed to be controlled (see for example WO 02/94713 A1 in the name of Tsinghua University) or improvements in products, as described in WO 02/095097 A1 in the name of Trustees of Boston College, which prepares non-aligned nanotubes of varied morphologies by varying the nature of the catalyst and the reaction conditions.

Document US 2001/0036549 A1 from Hyperion Catalysis International Inc. discloses an improved process for preparing CNTs by decomposition of a carbon source in contact with a multivalent transition metal or, preferably, a mixture of metals (such as Fe and Mo, Cr, Mn and/or Ce), the improvement in which consists of the fact that the transition metal, which forms a multiplicity of catalytic sites varying in size between 3.5 and 70 nm, is supported by an inorganic substrate having a size of less than 400 µm.

In the examples, the carbon source is a hydrogen/ethylene mixture, the respective partial pressures of which are 0.66 and 0.33, the reaction time at 650° C. is 30 minutes and the catalyst is prepared by impregnating a pyrolytic alumina (iron content not given, but estimated to be 15%) with iron nitrate as a methanol slurry. The productivity is 6.9 g/g in 30 minutes, while it reaches between 10.9 and 11.8 when molybdenum salt is added, for iron contents of around 9 to 10% and molybdenum contents of 1 to 2%. When the co-metal is cerium, chromium or manganese, the nanotube productivites are 8.3, 9.7 and 11, respectively.

It has also been found that iron acetylacetonate is less effective than iron nitrate.

In Example 16, the impregnation is carried out in aqueous phase by precipitation at a pH of about 6 by simultaneously adding iron nitrate and sodium bicarbonate solutions. The catalyst results in a selectivity of 10.5 for a 15% iron content and semicontinuous introduction into the reactor.

Another example, by impregnation in aqueous phase of iron and molybdenum, gives results as good as with methanol.

That document also shows that replacing iron with molybdenum at Mo contents of greater than 2.5% is somewhat unfavorable since a productivity of 8.8 is achieved in 30 minutes for a mixture containing equal proportions of Fe and Mo (total=16.7%).

Again in this document US 2001/0036549 A1, when a nonporous substrate, such as Degussa pyrolytic alumina, with a specific surface area of 100 $m^2/g$, is used, it is found to be difficult to impregnate large quantities of iron as only the external layer is accessible to the gas and the lower layers will exhibit insufficient catalytic activity.

Moreover, the technique using this kind of support is complicated since the particle size is 20 nm and the bulk density is 0.06, which increases the difficulty of industrial implementation.

In general, CNT synthesis processes using the CVD technique consist in bringing a carbon source into contact, at a temperature of between 500 and 1500° C., with a catalyst, generally in the form of substrate particles coated with metal, these being placed in a fluidized bed. The synthesized CNTs are "attached" to the catalyst substrate particles in the form of an entangled three-dimensional network, forming agglomerates with a $d_{50}$ greater than around 100 µm, typically about 300 to 600 µm. The $d_{50}$ represents the apparent diameter of 50% of the population of agglomerates. The CNTs thus obtained may be used as such in most applications, but it is also possible to subject them to a subsequent additional purification step intended to separate the CNTs from the catalyst substrate particles and also to reduce the size of the CNT agglomerates.

Whatever the catalyst used, it has been found that synthesizing CNTs by CVD results in a limited productivity of the catalyst, which may be expressed by the ratio of the CNTs formed to the catalyst involved. This limit is for example reached when all the available catalytic sites have reacted and/or when the entanglement of the CNTs around the support reduces the diffusion of the reactive gases (from the carbon source) to the catalytic sites, and reduces the catalyst area that can react.

The process for synthesizing CNTs forming the subject of the present invention makes it possible to obtain CNTs of higher purity while significantly improving the productivity of the catalyst employed, and to limit the formation of CNT agglomerates larger in size than 200 µm and/or to reduce their number and to do so without requiring an additional purification step.

According to the invention, the term "purity" means the (quantity of CNTs formed)/(quantity of CNTs formed+quantity of catalyst introduced) ratio, the catalyst consisting of metal supported on an organic solid. Thanks to the process according to the invention, CNTs containing more than 93% carbon are obtained.

DETAILED DESCRIPTION OF THE INVENTION

Figure 1:
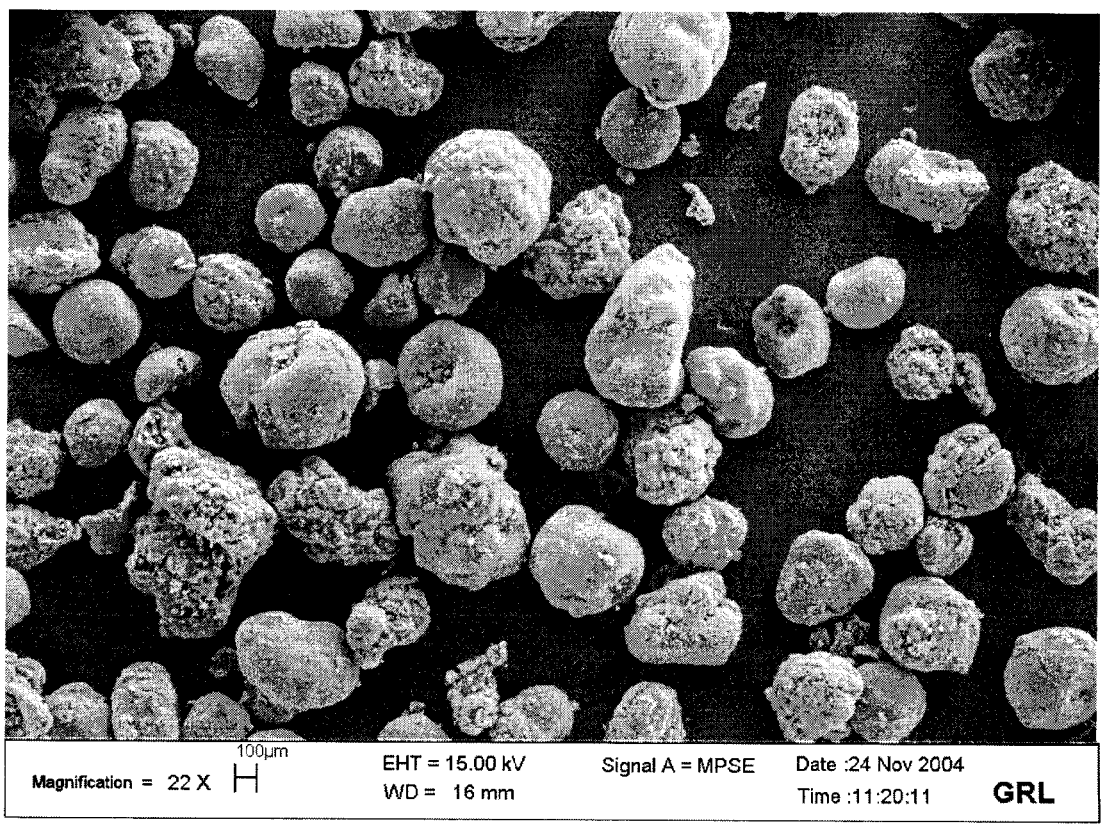
FIG. 1 is a scanning electron micrograph of the CNTs obtained according to the prior art.

The process for synthesizing CNTs according to the invention consists in a) bringing a first carbon source into contact, at a temperature between 500 and 1500° C., with a fresh catalyst, preferably as a fluidized bed, comprising at least one (one or more) multivalent transition metal(s), preferably covering porous substrate particles such as alumina for obtaining, by chemical vapor deposition (or CVD), CNTs in the form of an entangled three-dimensional network around catalyst particles or CNT agglomerates with a $d_{50}$ lying between 300 and 600 µm;

b) milling at least some of the CNT agglomerates (entangled CNT three-dimensional network around catalyst particles) resulting from step a) in such a way that the $d_{50}$ of the agglomerates obtained from the milling operation lies between 10 and 200 µm, preferably between 50 and 150 µm, preferably close to 100 µm or even more preferably close to about 50 µm;

c) fluidizing the milled product from step b) at a temperature lying between 500 and 1500° C. in the presence of a second carbon source with a view to obtaining CNT agglomerates, (entangled (CNT) three-dimensional network) optionally in the presence of fresh catalyst;

d) optionally, milling, under the operating conditions of step b), at least some of the CNTs formed in step c); and e) recovering the CNTs resulting from step c) or d).

According to the invention, the expression "lying between" also covers the limits.

The term "fresh catalyst" is understood to mean a catalyst used for the first time, in other words a catalyst that has not been regenerated.

According to the invention, the first and second carbon sources may be the same or different in terms of chemical nature and/or flow rate.

The carbon source or sources may be chosen from any type of carbon-containing material, such as methane, ethane, propane, butane, hexane, cyclohexane or any other higher aliphatic alkane containing more than 4 carbon atoms, ethylene, propylene, butene, isobutene, or any other higher aliphatic alkene containing more than 4 carbon atoms, benzen, toluene, xylene, cumene, ethyl benzene, naphthalene, phenanthrene, anthracene, acetylene, and any other higher alkyne containing more than 4 carbon atoms, formaldehyde, acetaldehyde, acetone, methanol, ethanol, carbon monoxide, etc., by themselves or as a mixture.

The purpose of the milling step b) is to deagglomerate the entangled CNT three-dimensional network on the catalyst, to reduce its particle size and to make active catalytic sites on said catalyst accessible.

The milling step b) may be performed hot or cold, and carried out using known techniques in equipment such as a ball mill, hammer mill, grinding mill, knife mill, gas jet mill, or any other milling system capable of reducing the size of the entangled CNT network, while still allowing its subsequent processing (step c)) using a fluidized-bed CVD technique, Thus, after this milling step b), the CNT agglomerates have a $d_{50}$ of greater than 10 µm, lying between 10 and 200 µm, preferably lying between 50 and 150 µm and even more preferably close to 100 µm. Fluidization is not possible if the $d_{50}$ of the CNTs after milling step b) is less than 10 µm.

Preferably, milling step b) is carried out by gas jet milling, in which the gases used for supplying the energy may advantageously be reactive gases used for synthesizing the CNTs.

Figure 2:
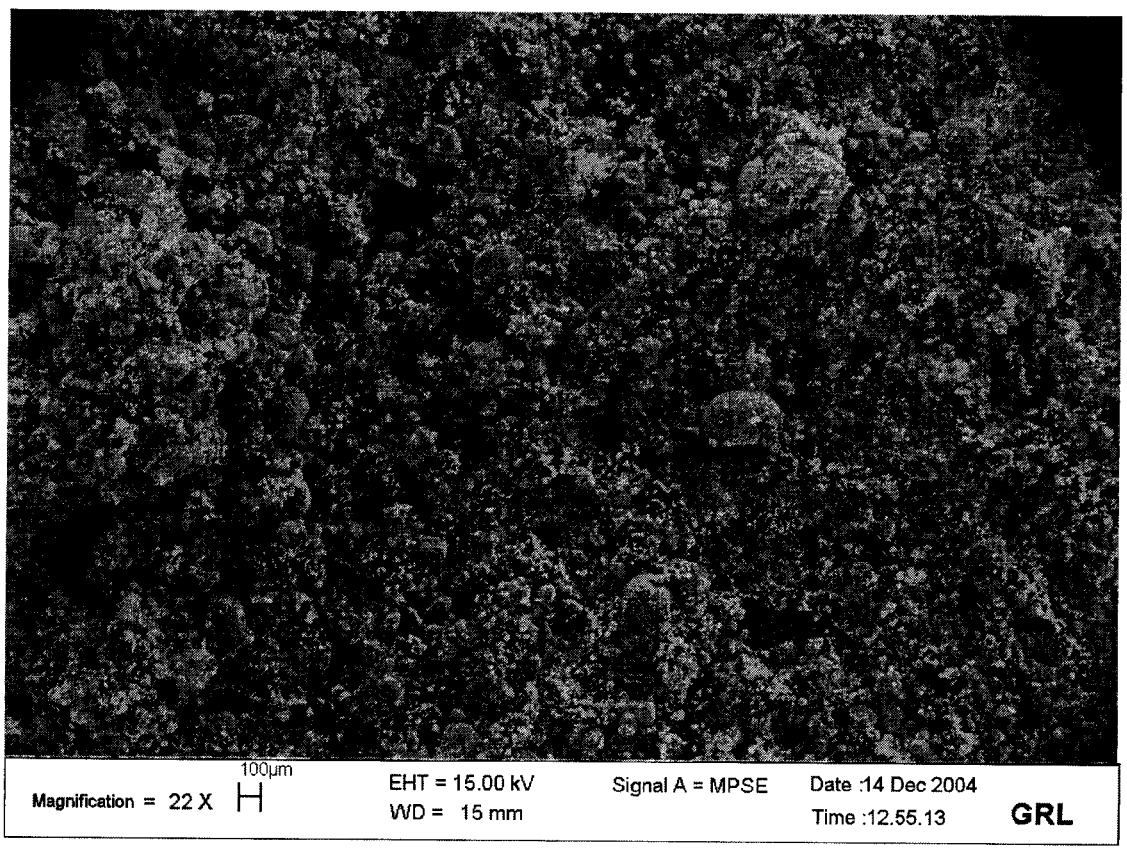
FIG. 2 is a scanning electron micrograph of the milled CNTs obtained according to the invention.
Figure 3:
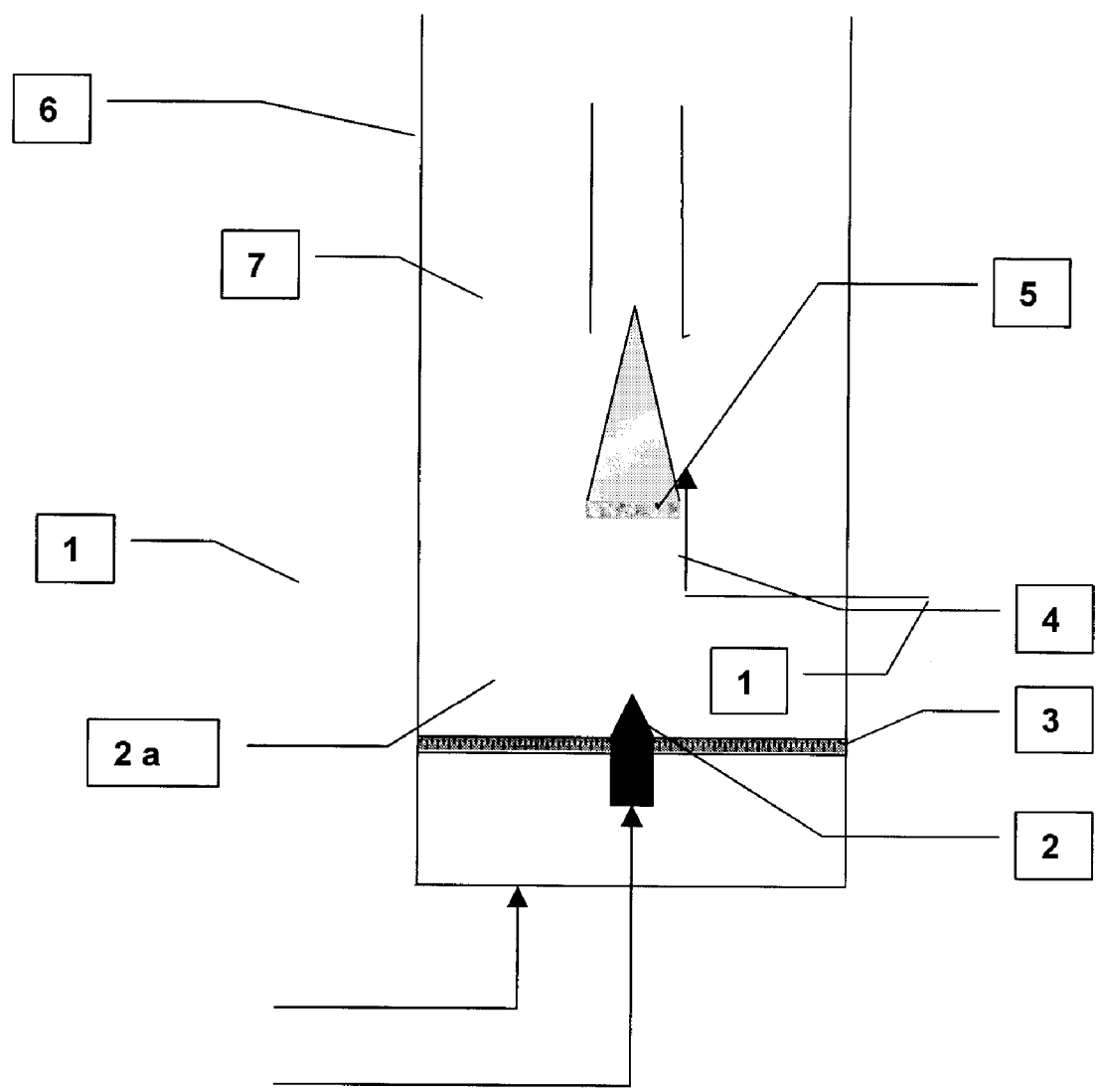
FIG. 3 illustrates a milling device according to the invention.

The present invention will now be illustrated with particular embodiment examples, the aim of which is in no way to limit the scope of the present invention, with reference to the appended drawings in which:

FIG. 1 is a scanning electron micrograph of the CNTs obtained according to the prior art;

FIG. 2 is a scanning electron micrograph of the milled CNTs obtained from step b) according to the invention; and FIG. 3 illustrates a milling device according to the invention which may be installed either within an actual synthesis reactor (6) for synthesizing CNTs by CVD (in situ milling) or in an external loop allowing possible recycling of all or part of the CNTs milled within the reactor (ex situ milling).

The milling device shown in FIG. 3 comprises a system of high-velocity gas jets generated through injectors (2) which entrain the CNT powder onto one or more targets (5) held by a support (4), that has to be subjected to the bombardment of the CNT agglomerates thus reducing the particle size by impact. The fluidization may be carried out by just these injectors (2) and/or in combination with a gas stream diffused by the distributor (3) around these injectors (2). The dimensions of the milling system and the flow rates of incoming gas (1) and (2a) used are suitable for obtaining good fluidization and the desired particle size, depending on the hardness and the density of the catalyst substrate.

The distributor (3) is designed to support the catalyst, which is in powder form, at the time $T_0$ of the synthesis.

The form of the milling device will advantageously be adapted according to the materials used and/or the behavior of the fluidized bed.

The process according to the invention may be carried out semi-continuously or in batch mode, but preferably continuously.

At least part of the entangled CNT/catalyst network resulting from step a) may be extracted from the synthesis reactor to a milling device operating continuously, semi-continuously or in batch mode, then injected (step c)) either into the same synthesis reactor of step a) or into a second CNT synthesis reactor by fluidized-bed CVD (finishing reactor).

It is also possible to carry out the milling (step b) in the synthesis reactor of step a), provided with milling means as shown by the device in FIG. 3, which avoids having to extract the powder from the reactor and therefore reduces the head losses and the risk of powder fly-off.

Thus, according to one embodiment of the invention, step b) is carried out inside the CNT synthesis reactor (6) by injecting some of the reactive gas or gases and/or an additional gas through injection nozzles (2) distributed over the surface of the distributor (3), the vertical gas jet or jets (1) entraining the particles toward a target (5). The particles consist of CNT agglomerates and/or catalyst. The target (5) is in the form of a cone, made of stainless steel, preventing deposition of particles at the top of the target (5).

This milling makes catalytic CNT growth sites accessible, thereby making it possible, during step c), to grow further CNTs on these now accessible sites, but also on the CNT agglomerates formed during step a), the size and/or the number of which have been reduced thanks to the milling. Growth of the CNTs during step a) and step c) may take place using identical gas sources (which is the case during a process involving in situ milling) or sources that differ both in terms of nature and flow rate (which is especially the case during a process involving ex situ milling).

The CNTs synthesized during introduction of synthesis gas and fresh catalyst, during step c), may be subjected to a further milling step d) under the conditions described above.

The CNTs thus obtained after step c) or d) are finally recovered.

These CNTs have improved properties, especially their dispersion in a material, in particular a polymer. It is thus possible to introduce a higher quantity of CNTs compared with the prior art, with better distribution and/or homogeneity, thereby improving the final properties of the material containing the CNTs.

These CNTs can be used in all applications in which CNTs are employed, especially in fields in which their electrical properties are desired (depending on the temperature and their structure, they may be conductors, semiconductors or insulators), and/or in fields in which their mechanical properties are desired, for example for the reinforcement of composites (the CNTs are one hundred times stronger and six times lighter than steel) and in electromechanical applications (they can elongate or contract by charge injection). For example, mention may be made of the use of CNTs in macromolecular compositions intended for example for the packaging of electronic components, for the manufacture of fuel lines (gasoline or diesel), antistatic coatings, in thermistors, electrodes, especially in the energy sector, for supercapacitors, etc.

EXAMPLES

Example 1

Comparative Example—Preparation of CNTs by CVD According to the Prior Art: Step a) Only A catalyst consisting of 35% iron was prepared by impregnating a Puralox SCCA 5-150 γ-alumina, having a median diameter of about 85 μm, with an iron nitrate solution. The impregnation was carried out in a fluidized bed with an air stream at 100° C. in order to keep the powder dry throughout the operation. 300 g of this catalyst were introduced as a layer in a 25 cm diameter reactor with an effective height of 1 m, the reactor being fitted with a disengagement device intended to prevent particle fines (fine catalyst particles) from being entrained downstream. The reactor was heated for 40 minutes at 300° C. under nitrogen, and then under hydrogen/nitrogen (20 vol %/80 vol %), increasing the temperature up to 650° C. over 75 minutes. At this temperature, a 3000 Nl/h stream of ethylene and a 1000 Nl/h stream of hydrogen were introduced, this corresponding to an ethylene partial pressure of 0.75.

When the ethylene was no longer being consumed, no more CNT was produced: the ethylene and hydrogen were then replaced with a nitrogen purge.

1 g of catalyst produced 15 g of CNTs. The CNT production ratio is therefore 15, i.e. a carbon purity of 93% (15/(15+1)).

Particle size analysis of the CNT agglomerates gave a $d_{50}$ of 420 μm (i.e. a layer of CNTs with a thickness of about 150 μm on the surface of the catalyst, the median diameter of the catalyst (alumina substrate+Fe) being about 85 μm).

In FIG. 1, several agglomerates substantially larger than 200 μm in size may be seen.

Example 2

According to the Invention—Ex Situ Milling

The product obtained in Example 1 was subjected to tangential air jet milling in an apparatus sold by Alpine under the name Spiral jet mill 50 AS.

The gas flow rate and the injection time were set so as to reduce the agglomerates obtained according to Example 1 with a $d_{50}$ of 40 μm.

A 5 g specimen of this milled product was introduced, under the CNT synthesis conditions according to Example 1, with an ethylene/hydrogen volume ratio of 3/1, into a 5 cm diameter reactor.

By comparing FIG. 2 with FIG. 1, it may be clearly seen that the process according to the invention results in a very small number of CNT agglomerates with a diameter greater than 200 μm. The final product thus formed is therefore more easily dispersed within a material, in particular a polymer.

At the end of synthesis, 6.4 g of final product were recovered, i.e. an increase of 28% (100×(6.4−5)/5) with respect to the quantity of product introduced. The CNT production was therefore 19.2 (1 g of catalyst gave 19.2 g of CNTs) i.e. a carbon purity of 95% (19.2/(19.2+1)).

Example 3

According to the Invention—In Situ Milling

The product obtained in Example 1 was subjected to air jet milling directly in the synthesis reactor according to FIG. 3 appended hereto.

The milling was carried out at room temperature in the CNT synthesis reactor (6), which was a vertical tube 5 cm in diameter fitted with a porous distributor (3) equipped with a nozzle (2) for introducing high-velocity gas. The medium (7) was fluidized by a nitrogen stream (1) flowing through the distributor and a second stream (2a) passing through the nozzle (1).

The gas flow rate and the injection time were set to reduce the agglomerates obtained according to Example 1 with a $d_{50}$ of 40 µm.

The final product thus obtained can be dispersed easily and homogeneously in a polymeric material, for the purpose of modifying its mechanical, electrical and/or thermal properties.

The invention claimed is:

1. A process for synthesizing carbon nanotubes, comprising:
   a) bringing a first carbon source into contact, in a CNT synthesis reactor, at a temperature between 500 and 1500° C., with a fresh catalyst comprising at least one multivalent transition metal, thereby forming by chemical vapor deposition (CVD), CNTs in the form of an entangled three-dimensional network around catalyst particles or agglomerates with a $d_{50}$ between 300 and 600 µm;
   b) milling at least some of the CNTs resulting from step a) to obtain a $d_{50}$ of between 10 and 200 µm.
   c) fluidizing the milled product from step b) at a temperature between 500 and 1500° C. in the presence of a second carbon source to obtain CNTs;
   d) optionally, milling, at least some of the CNTs formed in step c) to obtain a $d_{50}$ of between 10 and 200 µm; and thereafter
   e) recovering the CNTs resulting from step c) and/or step d).

2. The process as claimed in claim 1, characterized in that the first carbon source and the second carbon source are of the same chemical nature and have the same flow rate.

3. The process as claimed in claim 1 characterized in that the catalyst is in fluidized bed form.

4. The process as claimed in claim 1, characterized in that the multivalent transition metal is covering porous substrate particles.

5. The process as claimed in claim 1, characterized in that said process operates continuously.

6. The process as claimed in claim 1, characterized in that step b) is carried out inside the CNT synthesis reactor.

7. The process as claimed in claim 1, characterized in that step b) is carried out inside the CNT synthesis reactor by injecting reactive gas or gases and/or an additional gas through injection nozzles distributed over the surface of a distributor to create vertical gas jets which entrain the CNTs toward a target.

8. The process as claimed in claim 1, wherein a device for said milling comprises a gas jet system for injecting gas through injectors to form gas jet streams, and at least one target which is subjected to the bombardment of the CRT agglomerates carrier by said gas jet streams.

9. The process as claimed in claim 8, in which the target is conical in shape.

10. The process as claimed in claim 1, characterized in that step b) is performed outside the synthesis reactor.

11. CNTs obtained by the process as defined in claim 1.

12. The process of claim 1 characterized in that said fluidizing takes place in the presence of a catalyst.

* * * * *